Sept. 27, 1927.

A. T. J. BAHR 1,643,534

COLLAPSIBLE TIRE RIM

Filed Oct. 26, 1926

Inventor
AUGUST T. J. BAHR
By Thomas R. Harvey
Attorney

Sept. 27, 1927.  1,643,534
A. T. J. BAHR
COLLAPSIBLE TIRE RIM
Filed Oct. 26, 1926  2 Sheets-Sheet 2
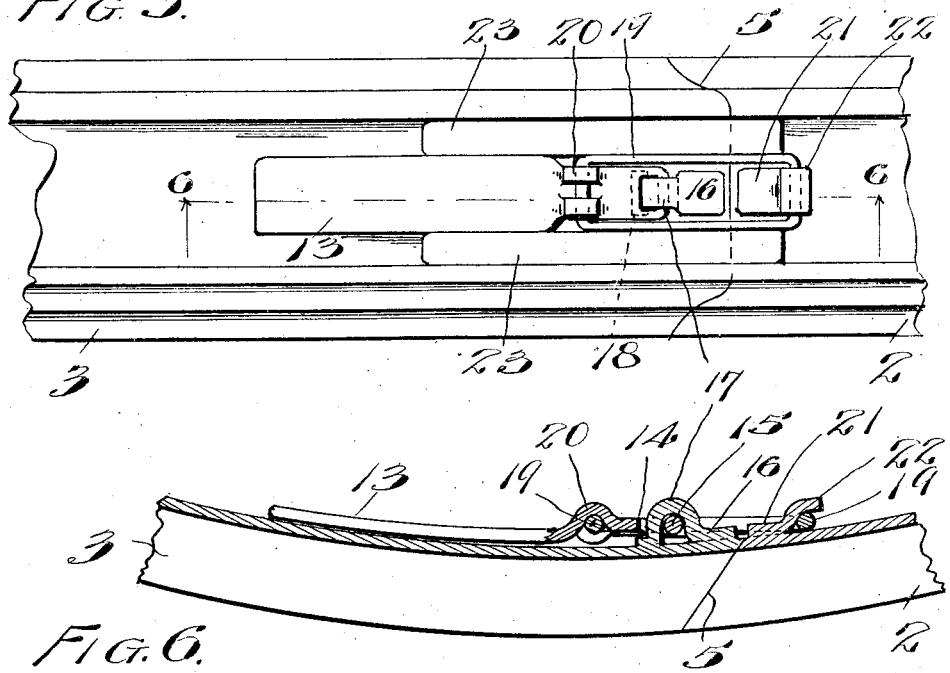
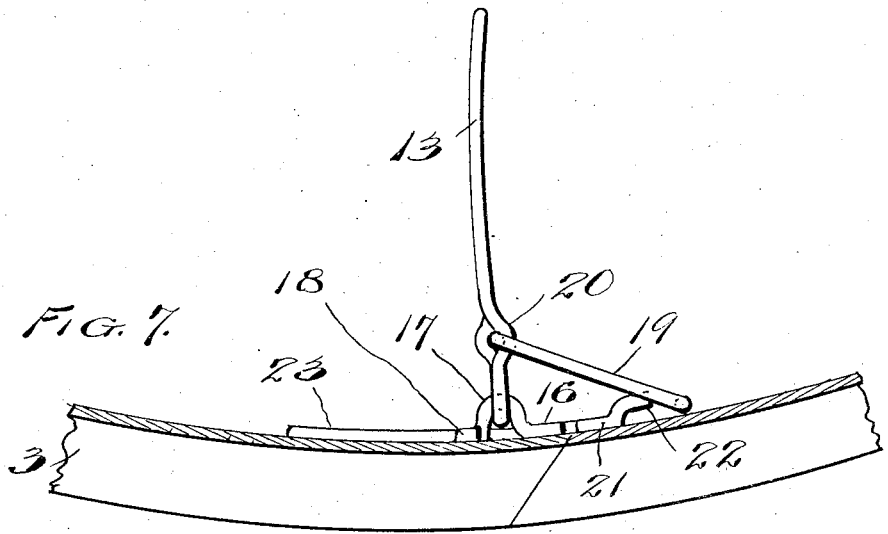
Inventor
AUGUST T. J. BAHR
By Thomas R. Harney
Attorney Patented Sept. 27, 1927.

1,643,534

UNITED STATES PATENT OFFICE.

AUGUST T. J. BAHR, OF KANSAS CITY, MISSOURI, ASSIGNOR TO GEORGE B. ROONEY, OF FAIRVIEW, KANSAS.

COLLAPSIBLE TIRE RIM.

Application filed October 26, 1926. Serial No. 144,201.

My present invention relates to improvements in collapsible tire-rims for use in connection with tires of pneumatic wheels for automotive vehicles. The rim is demountable and is of the sectional, hinged, type and is especially adapted for providing means whereby the rim may quickly and easily be removed from the tire when necessary for making repairs to the latter, and for facility in assembling the rim and tire preparatory to mounting the tire and rim on the wheel. The sectional hinged rim is simple in construction and comparatively inexpensive in cost of manufacture, and locking means are provided for securing the adjoining free ends of the rim, which locking means eliminates the necessity for use of tools when locking or unlocking the rim with relation to the tire. The locking device is strong, compact, durable, and effective for rigidly joining the free ends of the rim sections. The hinge joint between the rim sections is fashioned in such manner as to eliminate danger of injury from rust in the joint and to insure a substantially supported joint possessing stability and avoiding any exposed edges that might cut or mar the tire. The locking device also is fashioned in such manner as to present smooth surfaces to the tire and wheel and to avoid exposing edges to the tire that might cut the latter.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 5 is a plan view of the lock or fastening device between the free ends of the hinged sections.

Figure 6 is a sectional view at line 6—6 of Figure 5.

Figure 7 is a sectional view of the rim showing the lock in open position.

Figure 1:
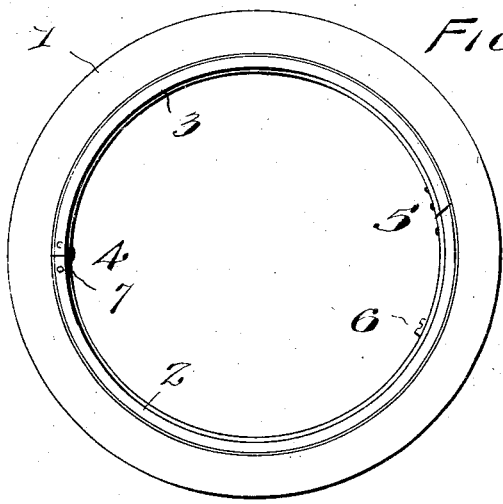
Figure 1 is a view in side elevation showing a wheel tire equipped with the rim of my invention.
Figure 4:
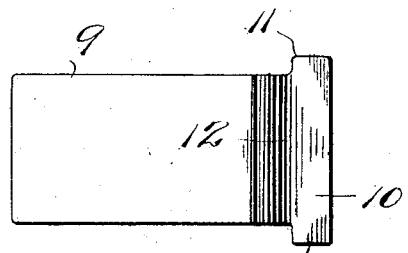
Figure 4 is a detail view of the hinge plate which in actual use is spot welded at the hinge end of one of the rim sections.
Figure 2:
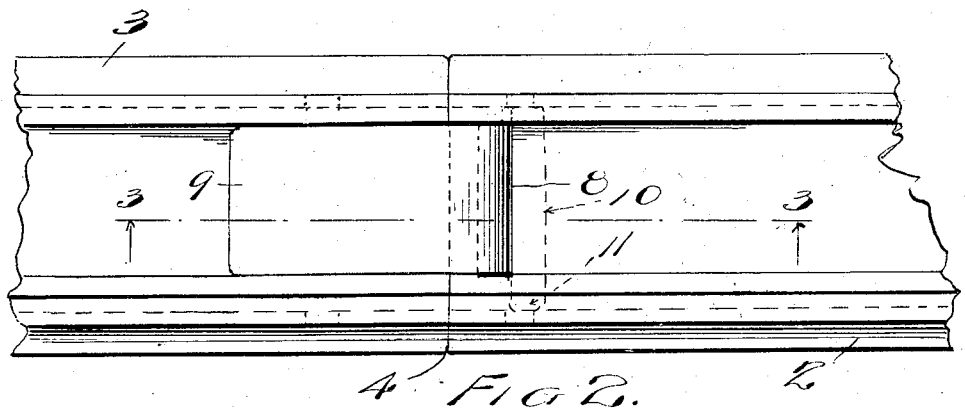
Figure 2 is an enlarged plan view of the hinge portion of the rim.
Figure 3:
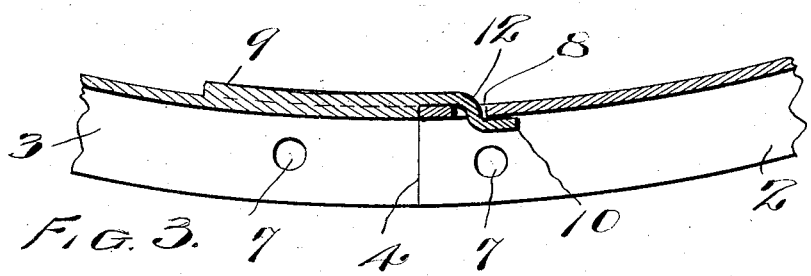
Figure 3 is a sectional view at line 3—3 of Figure 2.

In order that the general assembly and arrangement of parts may readily be understood I have shown in Figure 1 a standard tire as 1 having a demountable rim made up of a large section 2 and a smaller section 3, of which the hinge joint is indicated at 4 and the lock joint 5 is cut on a bias or angle in order that the rim may be collapsed when the locking device is released. For collapsing the rim the tire is held in standing or upright position as in Figure 1; by bearing down upon the upper part of the wheel it is "flattened" or distorted and the free end of the shorter section 3 is pushed past the complementary end of the longer section to release the rim.

The lug 6 and holes 7 of the rim, and other usual accessories for a complete standard tire are used or indicated.

In the formation of the hinge joint between the two rim sections I provide a transversely extending slot 8 near the end of the section 2. On the complementary end of the section 3 is spot-welded a plate 9 fashioned with a transversely extending head 10 with ends 11 projecting beyond the end walls of the slot 8. Between the plate and its head, a neck formed as a compound curve or bend 12 is provided. Before the plate 9 is welded to its section 3 the smaller end of the plate is passed through the slot 8 and then the plate is spot welded to its section, leaving the neck or bend 12 free to work in the slot and the ends 11 retaining the head against displacement. This T-shaped head provides a joint having the required freedom of movement, and at the same time the hinge insures a smooth and compact joint that will not cut the tire, and the special T-shape of the head prevents displacement by holding the jointed ends always in alinement.

In assembling the rim on the tire, before the latter is inflated to its normal pressure, the larger section is first placed in position on the inner periphery of the tire, with the shorter section above, and flexed on its hinge joint (the tire being in position of Fig. 1). The tire is flexed or distorted by pressure from above, the short section is snapped upwardly into place and the bias cuts of the joint 5 slip into place. These free ends are then locked together by manipulation of the lever 13 which is a flat plate, slotted at 14 to provide an end pivot bar 15, and pivotally connected to a plate 16. This plate is fashioned with a bend to form an eye or loop 17 for retaining the pivot bar of the lever and a T-head is also fashioned integral with this loop or eye. The plate 16 and its head 18 are preferably spot-welded to the rim section, after the pivot bar and its bearing eye 17 have been properly associated.

A rectangular clamping yoke 19 at one end is pivotally connected at 20 to the lever and the free end of this yoke is adapted to co-act with a plate 21 and its hook 22 in locking the bias-cut ends together. The plate 21 is welded to the face of the section 2 near its free end and it will be apparent that with the free end of the yoke slipped under the hook 22, as the lever is turned to position in Figures 5 and 6, flat against the face of the rim, the complementary bias cut edges 5 are drawn together and retained in this position to lock the rim sections together.

To guide the lever and retain it against lateral displacement, two guide bars 23 are provided, one at each side of the lever. These guide bars are metal strips that are welded to the face of the section 3 to form a groove for the reception of the lever and also to receive and retain the yoke against lateral displacement.

While I have shown one complete exemplification of my invention it will be understood that changes and alterations may be made therein, within the scope of my appended claim, without departing from the principles of my invention.

Having thus fully described my invention, what I claim as new and desire to secure by Letters Patent is—

In a demountable rim comprising hinged sections having bias-cut free ends, the combination with a hook on one of said ends, of a pivoted locking lever on the other end, a rectangular yoke pivoted on the lever and adapted to engage said hook, and a pair of laterally disposed guide bars forming a groove on the face of the rim for said lever and yoke when the latter are in locked position.

In testimony whereof I have affixed my signature.

AUGUST T. J. BAHR.